United States Patent [19]

Kniewske et al.

[11] Patent Number: 5,258,429
[45] Date of Patent: Nov. 2, 1993

[54] CELLULOSE ETHER COMPOSITIONS FOR AQUEOUS MEDIA

[75] Inventors: Reinhard Kniewske, Fallingbostel; Eugen Reinhardt, Walsrode, both of Fed. Rep. of Germany

[73] Assignee: Wolff Walsrode AG, Walsrode, Fed. Rep. of Germany

[21] Appl. No.: 887,124

[22] Filed: May 20, 1992

Related U.S. Application Data

[63] Continuation of Ser. No. 574,311, Aug. 29, 1990, abandoned.

[30] Foreign Application Priority Data

Sep. 5, 1989 [DE] Fed. Rep. of Germany ....... 8929400

[51] Int. Cl.$^5$ .................. C08L 1/26; C08L 51/02; C08L 33/02; C09J 3/04
[52] U.S. Cl. ................... 524/31; 524/43; 524/45; 524/46; 524/47
[58] Field of Search .......... 524/31, 43, 45, 46, 524/47; 127/59

[56] References Cited

U.S. PATENT DOCUMENTS 4,134,863  1/1979  Fanta et al. ............... 527/312
4,421,129  12/1983  Wingard ................... 132/163
5,032,659  7/1991  Heidel .................... 527/300

FOREIGN PATENT DOCUMENTS 0131090  1/1985  European Pat. Off. .
3018764  12/1981  Fed. Rep. of Germany .
3609545  9/1987  Fed. Rep. of Germany .
1104210  2/1968  United Kingdom .
2082614  3/1982  United Kingdom .

OTHER PUBLICATIONS

WPIL, File Suppler, An=89-058064, Derwent Publications Ltd., London, GB; & JP-A-87 063 421 (Kuraray K. K.) 13-01-1989.

Primary Examiner—John Kight, III
Assistant Examiner—Jeffrey Culpeper Mullis
Attorney, Agent, or Firm—Sprung, Horn, Kramer & Woods

[57] ABSTRACT

Cellulose ether compositions based on rapidly dissolving, pulverulent, water soluble cellulose ethers contain swellable and suction active superabsorbents to prevent the formation of lumps when dissolved. The cellulose ether composition can be converted into compression moulded pieces which retain the rapid solubility and dissolve without forming lumps.

9 Claims, 1 Drawing Sheet

CELLULOSE ETHER COMPOSITIONS FOR AQUEOUS MEDIA

This application is a continuation of application Ser. No. 574,311, filed Aug. 29, 1990, now abandoned.

The present invention relates to new cellulose compositions for aqueous media, characterised in that pulverulent cellulose ethers contain superabsorbents with high swelling and suction power, optionally together with other auxiliary agents and additives.

Cellulose ether compositions are used in various fields, e.g. the building industry, the ceramics industry, the oil industry, in cosmetics, pharmaceutical products and detergents, in the textile industry, etc. In many of these fields it is important to dissolve the cellulose ether compositions, which are in a dry form, as rapidly as possible. This frequently requires the cellulose ether composition to be used as a rapidly dissolving, very fine powder, which has the disadvantage of producing dust as well as forming lumps when incorporated in aqueous systems. These serious problems occur mainly in the preparation of building materials but also in the preparation of rapidly dissolving pastes such as sizes.

DE-A-31 03 338 describes a process which enables rapidly dissolving sizes to be prepared on the basis of pulverulent cellulose ethers. In this process, the pulverulent, optionally partially cross-linked cellulose ethers are converted into a granulate with the addition of water in a granulating apparatus. For packaging purposes, these specially granulated cellulose ethers can be compressed into tablets, briquettes, needles, strands or pellets. As described in DE-A-31 03 338, the compression pressure must be carefully selected to ensure that the pieces formed will be mechanically stable without loss of the pore structure of the fine granulate or impairment of the rapid solubility.

It was an object of the present invention to provide rapidly dissolving compositions of cellulose ethers which dissolve readily without the formation of lumps even though they have not previously been granulated.

The invention relates to a cellulose ether composition which is characterised in that the composition contains at least one cellulose ether and at least one superabsorbent.

By superabsorbent is meant a product which has a high absorption capacity for water and a high suction power for water. Preferred superabsorbents have a) a water absorption capacity of at least 50 g per g, in particular at least 100 g per g, under the given conditions,
b) a suction power of at least 20 g per g, in particular at least 25 g per g, after 5 minutes under the given conditions, and
c) a water absorption rate in distilled water at room temperature of
at least 8 g/g after 30 s
at least 13 g/g after 60 s
at least 20 g/g after 120 s.

Figure 1:
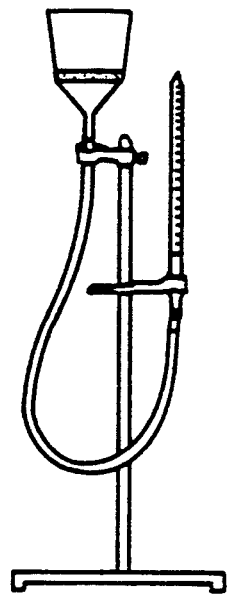
FIG. 1 is a schematic of a G3 frit filled with deionized water to a top edge of a porous matrix.

| Method | Procedure |
| --- | --- |
| Water absorption capacity | 1. Leave absorbent to swell in about 70 ml of liquid for 60 min.<br>weight: 150 g in deionised water<br>2. centrifuge for 1 h at 4000 revs per min (laboratory centrifuge)<br>3. separate sol component, weigh gel content after dabbing off with cellulose cloth<br>4. Calculation of water absorption capacity (WA):<br><br>$$WA = \frac{\text{weight of gel content in g}}{\text{initial weight of product in g}}$$ |
| Suction power | 1. 150 mg of product are scattered over a G3 frit (FIG. 1) filled with deionised water to the top edge of the porous matrix.<br>2. Product absorbs the liquid by suction against the hydrostatic pressure and swells.<br>3. The quantity of absorbed liquid can be read off the graduation on the pipette.<br>4. Calculation of suction power (SK) at time t:<br><br>$$SK_t = \frac{\text{ml of absorbed liquid}}{\text{g initial weight of product}}$$ |

The superabsorbents suitable for use in the cellulose ether compositions according to the invention are predominantly water insoluble, polymeric substances which swell on contact with aqueous liquids. The swelling process is determined by a polymeric network or graft structure.

The superabsorbents are preferably polymers having the following chemical composition:

| | |
| --- | --- |
| fully synthetic: | * cross-linked polyacrylates<br>* polyvinyl acetate/acrylic acid copolymers<br>* polyvinyl alcohol copolymers<br>* polyethylene oxide<br>* isobutylene/maleic acid copolymers<br>* hydrolysed polyacrylonitrile |
| semi-synthetic: | * starch/polyacrylate graft copolymers<br>* hydrolysed starch/polyacrylonitrile graft copolymers<br>* carboxymethylcellulose |
| natural: | * alginate |

The superabsorbents are preferably slightly cross-linked polyacrylates or polyacrylate copolymers or starch graft copolymers. Particularly preferred polyacrylates are characterised by their structure of partially neutralised and slightly cross-linked polyacrylic acid. The neutralisation preferably amounts to neutralisation of 70 to 99% of the carboxylic acid groups in the form of the sodium salt.

Polyacrylates of this type are known, e.g. from DE-A-37 16 945, DE-A-36 09 545 and EP-A-02 34 202.

Particularly preferred starch graft copolymers are characterised by their structure comprising starch as graft basis and partially neutralised, optionally slightly cross-linked polyacrylic acid as graft "branches". When prepared by the conventional method, such starch graft copolymers also contain homopolymers of partially neutralised and possibly cross-linked polyacrylic acid.

Such starch graft copolymers have been disclosed, e.g. in DE-A-34 30 676, DE-A 36 13 309, U.S. Pat. No. 3 661 815, EP-A-0 173 517 and EP-A-0 242 529.

The use of superabsorbents is already known in other fields, e.g. in the manufacture of surgical products (babies' nappies, incontinence pads), agriculture and horticulture (soil improvement, seed compost), industrial applications (prevention of dew formation, dewatering agents, pocket heaters, dry batteries, toys), but their use together with cellulose ethers has never been mentioned in these contexts.

The grain size of a superabsorbent is important in determining its suitability for use in cellulose ether compositions according to the invention. It should preferably be below 100 μm to prevent damage to the aqueous system by gel particles. For this reason, the pressure stability of the swelled particles should also be as low as possible.

The superabsorbents preferably have a grain size of from 50 to 200 μm, in particular from 50 to 100 μm. Mixtures of superabsorbents may, of course, be used instead of a single absorbent. Mixtures composed of fully synthetic and semi-synthetic absorbents are particularly preferred, in particular mixtures of cross-linked polyacrylates and starch/polyacrylate graft copolymers.

In a preferred embodiment, the superabsorbent is present in a quantity of from 0.001 to 60% by weight, preferably from 0.01 to 10% by weight, based on the whole cellulose ether composition.

The cellulose ethers used may in principle be any cellulose ethers which are water soluble. Methyl cellulose, methyl cellulose mixed ethers, carboxymethyl cellulose, hydroxyethyl cellulose and hydroxypropyl cellulose are particularly preferred. Mixtures of cellulose ethers may be used instead of a single cellulose ether, in particular combinations of carboxymethyl cellulose with methyl cellulose or methyl cellulose mixed ethers and combinations of hydroxyethyl or hydroxypropyl cellulose with other cellulose ethers.

It is surprisingly found that the cellulose ether combinations according to the invention can be made up into tablets, briquettes, strands, plates or pellets without being first granulated. The important advance over the state of the art is thus achieved that the granulating step, which is not only expensive but has an adverse effect on the dissolving time, can be dispensed with by simple means.

In addition, the cellulose ether combinations according to the invention may contain conventional auxiliary substances, in particular fillers, synthetic resin dispersion powders, preservatives, defoamants, substances for producing air pores, and wetting agents.

Such auxiliary substances are preferably used in a quantity of at most 50%, in particular up to 10%.

The cellulose ether preparations according to the invention are suitable in particular for the preparation of sizes and pastes.

It has been found that the cellulose ether compositions according to the invention have important advantages over the state of the art when used as wall paper pastes, namely:
two-sidedness,
increase in open time,
joint seam strength.

The two-sidedness refers to the amount of paste left on the separate lengths of wall paper when they are unfolded after they have been pasted and folded together. A 50:50 distribution, which is ideal, has not hitherto been achieved with any wall paper paste. The distribution is generally in the region of 70:30 or 60:40. The superabsorbent improves the two-sidedness in the direction of 50:50.

The use of superabsorbents also increases the length of open time, so that the wall paper remains for longer in a state in which it can slide over the surface of the wall. This and the improved two-sidedness also improve the joint seam strength so that it becomes unnecessary to add an additional amount of paste to the edges of the wall paper either at the beginning or subsequently. The cellulose ether compositions according to the invention suitable for use as wall paper pastes in addition have the following special advantages by virtue of the presence of superabsorbent which is capable of storing water reversibly:

The film of paste formed after drying has atmosphere regulating properties. A high atmospheric moisture level is reduced by the absorption of water vapour and absorbed moisture is released when the atmospheric moisture level is low.

The superabsorbent facilitates removal of the wall paper by virtue of its swelling properties since it rapidly absorbs the water applied with the wall paper remover and activates the film of paste so that the latter dissolves more rapidly.

The cellulose ether compositions according to the invention may also advantageously be used as coating for the back of wall paper. Of the two types of back coating employed for wall paper, the so called dusting process is particularly important. In this process, the web of paper is coated with a thin solution of paste, and MC, CMC or starch is scattered in the form of powder (dust) onto the thin coating while it is still wet. The pattern is then printed on the uncoated side of the paper and the continuous web is cut up as required for use, for example to a paper width of 53 cm. The paper web is then drawn through water to activate the layer of paste and is then put onto the wall. The contact times with water are generally in the region of 10 s, which is in many cases too short because it does not enable sufficient water to be taken up by the paste. If, however, the paste is left to soften in water for too long, there is a risk of the water getting into the paper. This would result in irregularities and optical defects in the pattern on the wall paper. If superabsorbent is added to the MC, CMC, starch or mixtures thereof which are to be flocked, a contact time of 10 s is sufficient to bind the quantity of water and necessary active the paste. The treatment of the back-coated wall paper, which can be a tricky procedure, is greatly simplified and can be done without problems.

EXAMPLES

The substances used in the following Examples are characterised as follows:

1. Methyl cellulose: methylhydroxyethyl cellulose, average degree of substitution ($-OCH_3$) about 1.4, average molar degree of substitution (EO) about 0.2, viscosity (Rotovisko, MV II, 20° C., proportion in water 1:40): about 8000 mPa.s.

Superabsorbent of sodium polyacrylate: prepared according to Patent specification DE-A-36 09 545, which is equivalent to U.S. Pat. No. 4,873,299. Example No. 1

Water uptake capacity: 400 g of deionised water/g
suction power: 49 g of deionised water per g

| Water uptake rate: | after 30 s: 9 g/g |
| --- | --- |
| | after 60 s: 18 g/g |
| | after 120 s: 33 g/g. |

Example 1

194 g of a methyl cellulose having a maximum particle size of 200 μm were mixed with 6 g of superabsorbent. The superabsorbent of sodium polyacrylate had a maximum particle size of 100 μm. This cellulose ether composition was dissolved in 8000 g of water by first bringing the water into contact with a stirrer rod for 5 sec in one direction of movement and then pouring in the size for 10 sec with further stirring. After a further 5 sec. stirring, the direction of stirring was reversed and stirring was continued for a further 5 sec. Not a single lump formed when this experiment was repeated five times.

Comparison Example 1

200 g of the methyl cellulose size from Example 1 were stirred into water as in Example 1. This experiment was repeated five times. On average, one small lump of methyl cellulose was formed.

Figure 2:
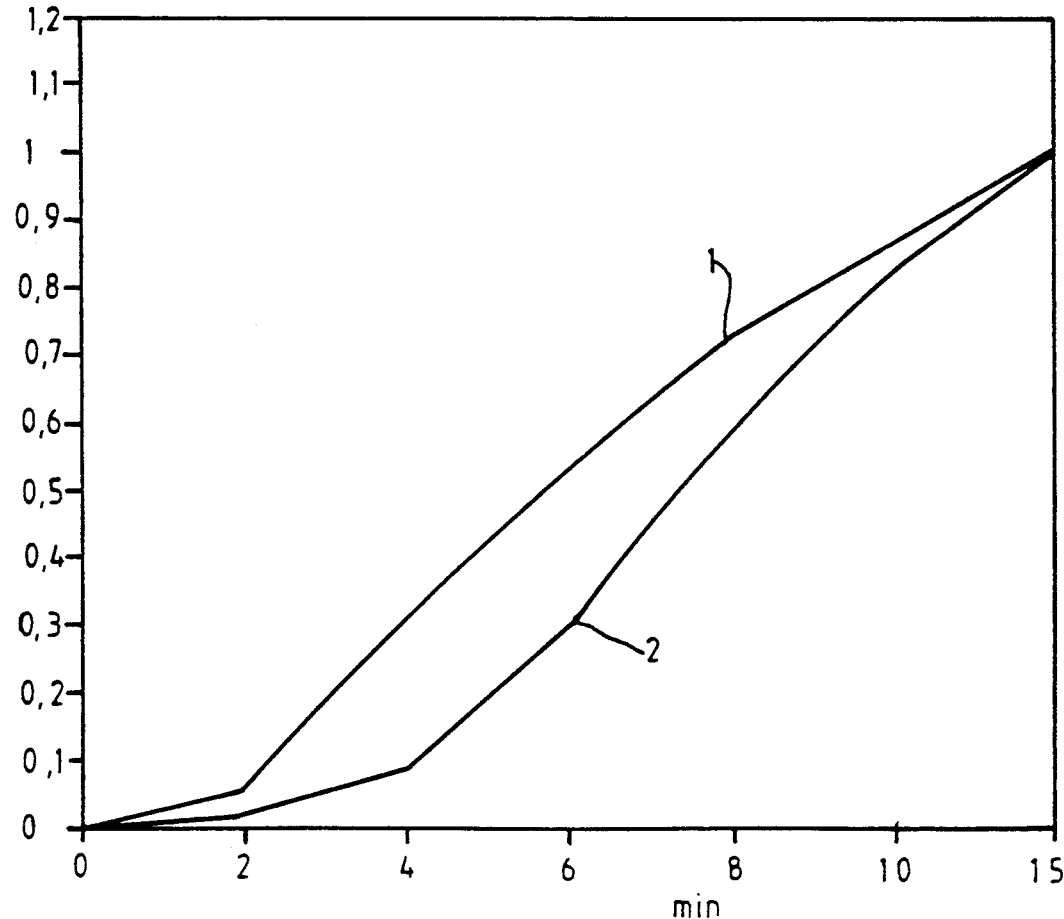
FIG. 2 is a graph for two compositions 1 and 2 of the ratio of the viscosity of the composition at time t to the viscosity of the same composition 15 minutes later (vertical axis) versus the time in minutes (horizontal axis).

The improved dissolution process observed in Example 1 compared with that of comparison Example 1 was found to be accompanied by a higher initial viscosity in the first few minutes when superabsorbent was incorporated in the cellulose ether composition (FIG. 2, graph by comparison with graph 2).

Example 2

20 g of the cellulose ether composition described in Example 1 were introduced into a ring mould having an internal diameter of 3 cm and an external diameter of 7 cm. The cellulose ether composition was compressed by application of a compression pressure of 100 bar and 150 bar, respectively. The rings thus obtained were placed on the surface of 800 g of water and the process of solution began instantly. After 1 minute, the mixture was stirred with a stirrer rod. At the end of this time, the cellulose ether composition could be dispersed without forming lumps.

Comparison Example 2

20 g of the methyl cellulose mentioned in Comparison Example 1 were formed into rings as described in Example 2 and brought into contact with water. After 1 min. the ring had only begun to dissolve on its outer surface and the cellulose ether composition could not be dispersed or finely distributed in the water by stirring.

We claim:

1. A compression molded composition formed by compression molding a composition comprising a previously ungranulated cellulose ether and a superabsorbent, the superabsorbent having:
   (a) a water absorption capacity of at least 50 g/g;
   (b) a suction power of at least 20 g/g after 5 minutes; and
   (c) a water absorption rate in distilled water of at least 8 g/g after 30 s, at least 13 g/g after 60 s, and at least 20 g/g after 120 s.

2. The compression molded composition according to claim 1, wherein the superabsorbent is a polymer selected from the group consisting of polymers formed from cross-linked polyacrylates, polyvinyl acetate/acrylic acid copolymers, polyvinyl alcohol copolymers, polyethylene oxide, isobutylene/maleic acid copolymers/ hydrolysed polyacrylonitrile, starch/polyacrylate graft copolymers, hydrolysed starch/polyacrylonitrile graft copolymers, carboxymethylcellulose, or alginate.

3. Compression molded composition according to claim 1, characterised in that the superabsorbent is based on polyacrylates or starch graft copolymers.

4. Compression molded composition according to claim 1, characterised in that the superabsorbent is contained therein in a quantity of from 0.001 to 60% by weight, based on the whole composition.

5. Compression molded composition according to claim 1, characterised in that the superabsorbent consists of grains substantially having a grain size below 100 μm.

6. Compression molded composition according to claim 1, characterised in that the cellulose ether contained therein is methyl cellulose, methyl cellulose mixed ether, carboxymethyl cellulose, hydroxy methyl cellulose or hydroxypropyl cellulose.

7. Compression molded composition according to claim 1, characterised in that it contains a combination of carboxymethyl cellulose with methyl cellulose or a methyl cellulose mixed ether.

8. Compression molded composition according to claim 1, characterized in that conventional additives are contained therein in a quantity of 0-50%, based on the whole composition.

9. A process comprising back coating wall papers with a wall paper paste, characterised in that the wall paper paste used is a paste based on a compression molded composition according to claim 1.

* * * * *

UNITED STATES PATENT AND TRADEMARK OFFICE
CERTIFICATE OF CORRECTION

PATENT NO. : 5,258,429
DATED : November 2, 1993
INVENTOR(S) : Kniewske, et al.

It is certified that error appears in the above-indentified patent and that said Letters Patent is hereby corrected as shown below:

Title Page (item 30)  Foreign Application Priority Data: After " Germany .... delete " 8929400 " and substitute -- 3929400 --

Signed and Sealed this

Twenty-second Day of August, 1995

Attest:

BRUCE LEHMAN

*Attesting Officer*   *Commissioner of Patents and Trademarks*